United States Patent
Liu et al.

(10) Patent No.: US 10,462,475 B2
(45) Date of Patent: Oct. 29, 2019

(54) METHODS OF PALETTE BASED PREDICTION FOR NON-444 COLOR FORMAT IN VIDEO AND IMAGE CODING

(71) Applicants: Shan Liu, San Jose, CA (US); Jing Ye, San Jose, CA (US); Xiaozhong Xu, State College, PA (US); Jungsun Kim, San Jose, CA (US); Wang-Lin Lai, San Jose, CA (US); Shaw-Min Lei, Zhubei (TW)

(72) Inventors: Shan Liu, San Jose, CA (US); Jing Ye, San Jose, CA (US); Xiaozhong Xu, State College, PA (US); Jungsun Kim, San Jose, CA (US); Wang-Lin Lai, San Jose, CA (US); Shaw-Min Lei, Zhubei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

(21) Appl. No.: 15/534,534

(22) PCT Filed: Dec. 16, 2015

(86) PCT No.: PCT/US2015/065946
§ 371 (c)(1),
(2) Date: Jun. 9, 2017

(87) PCT Pub. No.: WO2016/100424
PCT Pub. Date: Jun. 23, 2016

(65) Prior Publication Data
US 2017/0374372 A1 Dec. 28, 2017

Related U.S. Application Data

(60) Provisional application No. 62/114,671, filed on Feb. 11, 2015, provisional application No. 62/107,583, filed on Jan. 26, 2015, provisional application No. 62/094,137, filed on Dec. 19, 2014.

(51) Int. Cl.
*G06K 9/36* (2006.01)
*H04N 19/186* (2014.01)
(Continued)

(52) U.S. Cl.
CPC ......... *H04N 19/186* (2014.11); *H04N 19/103* (2014.11); *H04N 19/119* (2014.11);
(Continued)

(58) Field of Classification Search
CPC .. H04N 19/186; H04N 19/593; H04N 19/103; H04N 19/119; H04N 11/00; H04N 19/70; G06T 3/4007
See application file for complete search history.

(56) References Cited

U.S. PATENT DOCUMENTS 6,252,989 B1 * 6/2001 Geisler ............... H04N 19/176
345/555
9,505,260 B2 * 11/2016 Walter ..................... B44F 1/08
(Continued)

FOREIGN PATENT DOCUMENTS

WO 2015/176690 A1 11/2015
WO 2016/100859 A1 6/2016

OTHER PUBLICATIONS

International Search Report dated May 13, 2016, issued in application No. PCT/US2015/065946.
(Continued)

*Primary Examiner* — Amir Alavi
(74) *Attorney, Agent, or Firm* — McClure, Qualey & Rodack, LLP (57) ABSTRACT

A method of video coding using palette coding mode for color video in a non-444 color format is disclosed. The non-444 video data can be converted to the 444 format so that the palette designed for the 444 format can be used for the non-444 video data. For the 4:2:0 color format, each
(Continued)

chroma sample collocated with corresponding quad luma samples is padded with three chroma samples to form converted quad chroma samples. For the 4:2:0 color format, if a current pixel does not belong to the color palette, one or more escape values are signaled for the current pixel and the escape value associated with the chroma sample of the current pixel for each color component is not signaled for three of the quad chroma sample locations collocated with corresponding quad luma samples.

14 Claims, 5 Drawing Sheets

(51) Int. Cl.
    *H04N 19/70*     (2014.01)
    *H04N 19/593*     (2014.01)
    *H04N 19/103*     (2014.01)
    *H04N 19/119*     (2014.01)
    *H04N 19/59*     (2014.01)
    *H04N 11/00*     (2006.01)

(52) U.S. Cl.
    CPC ........... *H04N 19/59* (2014.11); *H04N 19/593* (2014.11); *H04N 19/70* (2014.11); *H04N 11/00* (2013.01)

(56) References Cited

U.S. PATENT DOCUMENTS

| | | | |
|---|---|---|---|
| 2003/0174243 A1* | 9/2003 | Arbeiter | H04N 5/46 348/384.1 |
| 2004/0017939 A1 | 1/2004 | Mehrotra | |
| 2004/0119886 A1 | 6/2004 | Cook et al. | |
| 2007/0116370 A1 | 5/2007 | Smirnov | |
| 2008/0252638 A1* | 10/2008 | Riemens | H04N 13/15 345/419 |
| 2009/0074307 A1* | 3/2009 | Lu | G06T 9/00 382/232 |
| 2014/0140617 A1* | 5/2014 | Shigeta | G06T 3/4007 382/167 |
| 2014/0301474 A1 | 10/2014 | Guo et al. | |
| 2014/0301475 A1 | 10/2014 | Guo et al. | |
| 2014/0344691 A1 | 11/2014 | Guo et al. | |
| 2015/0341643 A1* | 11/2015 | Xu | H04N 19/593 375/240.02 |
| 2015/0381994 A1* | 12/2015 | Yu | H04N 19/186 375/240.24 |
| 2017/0374372 A1* | 12/2017 | Liu | H04N 19/70 |

OTHER PUBLICATIONS

Joshi, R., et al.; "High Efficiency Video Coding (HEVC) Screen Content Coding: Draft 2;" Joint Collaborative Team on Video Coding (JCT-VC) of ITU-T SG 16 WP 3 and ISO/IEC JTC 1/SC 29/WG 11; Jun.-Jul. 2014; pp. 1-366.

Lin, T., et al; "Mixed Chroma Sampling-rate coding: combining the merits of 4:4:4 and 4:2:0 and increasing the value of past 4:2:0 investment;" Joint Collaborative Team on Video Coding (JCT-VC) of ITU-T SG16 WP3 and ISO/IEC JTC1/SC29/WG11; Feb. 2012; pp. 1-5.

Lai, P.L., et al.; "Non-CE6: Syntax redundancy removal for palette mode with one index value;" Joint Collaborative Team on Video Coding (JCT-VC) of ITU-T SG 16 WP 3 and ISO/IEC JTC 1/SC 29/WG 11; Oct. 2014; pp. 1-2.

* cited by examiner

METHODS OF PALETTE BASED PREDICTION FOR NON-444 COLOR FORMAT IN VIDEO AND IMAGE CODING

CROSS REFERENCE TO RELATED APPLICATIONS

The present invention claims priority to U.S. Provisional Patent Application, Ser. No. 62/094,137, filed on Dec. 19, 2014, U.S. Provisional Patent Application, Ser. No. 62/107,583, filed on Jan. 26, 2015, and U.S. Provisional Patent Application, Ser. No. 62/114,671, filed on Feb. 11, 2015. The U.S. Provisional Patent Applications are hereby incorporated by reference in their entireties.

FIELD OF THE INVENTION

The present invention relates to palette coding for video data. In particular, the present invention relates to various techniques to apply palate coding to video data in 444 and non-444 color formats.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. Several coding tools for screen content coding have been developed. These tools related to the present invention are briefly reviewed as follow.

Palette Mode Coding

A new coding tool, named screen content coding (SCC) has been developed for HEVC as disclosed in JCTVC-S1005 (Joshi, et al., "*HEVC Screen Content Coding Draft Text 2*", Joint Collaborative Team on Video Coding (JCT-VC) of ITU-T SG 16 WP 3 and ISO/IEC JTC 1/SC 29/WG 11, 19th Meeting: Strasbourg, FR, 17-24 October 2014, Document: JCTVC-S1005). The palette-based coding is performed based on a coding unit (CU).

In the palette mode coding process, derivation of the color palette and index map is described as follows. A color palette is derived first by three components of a pixel value for the 444 component. The color palette stores N major colors. In specific, the N major colors correspond to the most significant N pixels with peak values in the histogram are selected as major colors.

The pixel values that are close to a major color will be quantized to the major color. When calculate the distance of current pixel value with the major colors, three components will be taken into consideration. In particular, the absolute differences between the three components with the major color will be added and the result is used to determine which major color for assigning a current pixel to. The pixel will compare with each major color to find the closest one and the pixel is assigned a major color having a shortest distance. Other pixels that do not belong to the major color set (also named color palette or palette) are designated as escape pixels. For each pixel, a color index is assigned to indicate which color in the palette it belongs to. For escape pixels, a special color index will used to indicate the escape.

The information signaled for the palette coding is shown as follows:

1. palette signaling: the color index table (also called palette table) size is first transmitted followed by the palette elements (i.e., color values). The related syntax elements include:
   1.1 palette_share_flag: specifies whether previous palette table is used for the current CU;
   1.2 palette_predictor_run: specifies which of previous palette table is re-used in the current palette table;
   1.3 palette_num_signaled_entries: specifies the number of palette entries that are not predicted from previous palette table;
   1.4 palette_entry: specifies pixel values for each component for entries that are not predicted from previous palette table;
   1.5 palette_escape_val_present_flag: specifies the presence of escape pixel in the current CU;
   1.6 cu_qp_delta_palette_abs: specifies the absolute value of the difference CuQpDeltaVal between the luma quantization parameter of the current coding unit and its prediction;
   1.7 cu_qp_delta_palette sign flag: specifies the sign of CuQpDeltaVal;
   1.8 cu_chroma_qp_palette_offset_flag: when present and equal to 1, specifies that an entry in the cb_qp_offset_list[ ] is used to determine the value of CuQpOffset$_{Cb}$ and a corresponding entry in the cr_qp_offset_list[ ] is used to determine the value of CuQpOffset$_{Cr}$. cu_chroma_qp_palette_offset_flag equal to 0 specifies that these lists are not used to determine the values of CuQpOffset$_{Cb}$ and CuQpOffset$_{Cr}$.
   1.9 cu_chroma_qp_palette_offset_idx: when present, specifies the index into the cb_qp_offset_list[ ] and cr_qp_offset_list[ ] that is used to determine the value of CuQpOffset$_{Cb}$ and CuQpOffset$_{Cr}$. When present, the value of cu_chroma_qp_palette_offset_idx shall be in the range of 0 to chroma_qp_offset_list_len_minus1, inclusive. When not present, the value of cu_chroma_qp_palette_offset_idx is inferred to be equal to 0; and
   1.10 palette_transpose_flag: indicating the scanning order for palette prediction
2. index map signaling: the pixels in the CU are represented by the indices by mapping each pixel value into an index according to the palette. The related syntax elements include:
   2.1 palette_run_type_flag: specifies run type of the current pixel;
   2.2 palette_index_idc: indicating the palette entry use of the pixel in case that palette_run_type_flag is copy_index_mode;
   2.3 palette_run_msb_id_plus1: (palette_run_msb_id_plus1−1) specifies index of the most significant bit in the binary representation of paletteRun. The value of palette_run_msb_id_plus1 shall be in the range of 0 to Floor(Log2((MaxPaletteRun))+1, inclusive;
   2.4 palette_run_refinement_bits: specifies the refinement bits in the binary representation of paletteRun; and
   2.5 palette_escape_val: specifies the quantized escape coded sample value for a component.

According to the existing HEVC practice, one palette table is signaled for each CU. Each entry of palette table can has three values with one value for each component. Table 1 shows an example of the palette table with three values for each entry corresponding to three color components.

TABLE 1

| Color index | Pixel value | | |
|---|---|---|---|
| 0 | Y0 | Cb0 | Cr0 |
| 1 | Y1 | Cb1 | Cr1 |
| 2 | Y2 | Cb2 | Cr2 |
| 3 | Y3 | Cb3 | Cr3 |
| ... | ... | ... | ... |

The coding unit syntax related to palette coding is shown in Table 2. A test regarding whether palette mode is enabled (i.e., palette_mode_enabled_flag), whether ChromaArrayType is equal to 3 (i.e., 4:4:4 color format), whether the current prediction mode is Intra prediction mode (i.e., CuPredMode[x0][y0]==MODE_INTRA), and whether the IntraBC flag is not asserted (i.e., !intra_bc_flag[x0][y0]) is performed as indicated by Note (2-1) in Table 1. If the test in Note (2-1) is asserted, a palette mode flag (i.e., palette mode flag[x0][y0]) is included as indicated by Note (2-2). Whether the palette mode flag is set is tested as shown in Noe (2-3). If the palette mode flag is equal to 1, palette coding is applied to luma and chroma components using joint palette as indicated by Note (2-4).

TABLE 2

| coding_unit( x0, y0, log2CbSize ) { | Note |
|---|---|
| ...... | |
| if( palette_mode_enabled_flag && ChromaArrayType == 3 && CuPredMode[ x0 ][ y0 ] == MODE_INTRA) | (2-1) |
|   palette_mode_flag[ x0 ][ y0 ] | (2-2) |
| if( palette_mode_flag[ x0 ][ y0 ] ) | (2-3) |
|   palette_coding( x0, y0, nCbS ) | (2-4) |
| else { | |
| ...... | |

In current SCM3.0 (Screen Content Coding Test Model version 3.0) draft and software, for video data in the 444 format, most of the above flags are shared by the three color components. Furthermore, a single color palette is signaled for all color components of a current coding unit and each entry of the color palette consists of one sample value from each of the three color components. In order to conserve bit rate, the color palette may be coded using predictive coding, where the predictor may correspond to a reconstructed palette associated with a previous coded coding unit.

In various video coding applications, the video data may be in a non-444 color format, where the chroma color samples may be at reduced spatial resolution compared to the luma component. Therefore, the chroma sample may not exist for each luma sample. Therefore, it is desirable to develop palette coding techniques for non-444 video data.

BRIEF SUMMARY OF THE INVENTION

A method of video coding using palette coding mode for color video in a non-444 color format, where the color video consists of one luma color component and two chroma color components. In one embodiment, the non-444 video data is converted to the 444 format so that the palette designed for the 444 format can be used for the non-444 video data. When the non-444 color format corresponds to a 4:2:0 color format, each chroma sample collocated with corresponding quad luma samples is padded with three chroma samples to form converted quad chroma samples. When the non-444 color format corresponds to a 4:2:2 color format, each chroma collocated with corresponding duo luma samples is padded with one chroma sample to form converted duo chroma samples.

For the 4:2:0 color format, if a current pixel does not belong to the color palette, one or more escape values are signaled for the current pixel and the escape value associated with the chroma sample of the current pixel for each color component is not signaled for three of the quad chroma sample locations collocated with corresponding quad luma samples. For the 4:2:2 color format, if a current pixel does not belong to the color palette, one or more escape values are signaled for the current pixel and the escape value associated with the chroma sample of the current pixel for each color component is not signaled for one of the duo chroma sample locations collocated with corresponding duo luma samples.

For non-444 video data, each chroma block is padded with chroma samples having a default value to form the converted chroma block.

Another aspect of the present invention addresses the palette formation for non-444 color formats. According to embodiments of the present invention, for the non-444 color format, the color palette includes color samples from more than one sample locations for at least one entry of the color palette or includes different numbers of samples for at least two entries of the color palette. In one example, for the 4:2:0 color format, each entry of the color palette consists four luma values corresponding to quad luma samples, one first chroma value corresponding to one first chroma sample collocated with the quad luma samples, and one second chroma value corresponding to one second chroma sample collocated with the quad luma samples. In another example, for 4:2:2 color format, each entry of the color palette consists two luma values corresponding to duo luma samples, one first chroma value corresponding to one first chroma sample collocated with the duo luma samples, and one second chroma value corresponding to one second chroma sample collocated with the duo luma samples. In yet another example, for a 4:2:0 color format, the color palette comprises first-type entries and second-type entries, where each first-type entry consists of one luma value from quad luma samples, one first chroma value of one first chroma sample collocated with the quad luma samples, and one second chroma value of one second chroma sample collocated with the quad luma samples, and wherein each second-type entry consists of three luma values for remaining three luma samples of the quad luma samples. In yet another example, the color palette comprises first-type entries and second-type entries, where each first-type entry consists of one luma value of one luma sample, one first chroma value of one first chroma sample, and one second chroma value of one second chroma sample from a same sample location, and wherein each second-type entry consists of one luma value for remaining luma sample positions not included in the first-type entries.

In another embodiment for palette coding for color video, two or more color palettes are used for multiple color components of the current block. One or more individual palette parameters for each of two or more color palettes of the current block can be signaled in sequence parameter set (SPS) of the video bitstream. The individual palette parameters may include maximum palette size, maximum palette predictor size or both. One or more common palette parameters for all of said two or more color palettes of the current block may also be signaled in sequence parameter set (SPS) of the video bitstream. Each of two or more color palettes of the current block can be predicted by an individual palette predictor for each color component, and the individual palette predictor of the current block can be updated separately.

In yet another embodiment, when the color format corresponds to the 444 format, each color component can be coded using a separate color palette consisting of only one color component in each entry or using a single color palette consisting of one luma component and two chroma components in each entry. When the color format corresponds to a non-444 format, each color component of the current block can be coded using the separate color palette consisting of only one color component in each entry. If the color components correspond to the non-444 color format, one index map is generated for each color component of the current block.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The existing palette coding has been designed with the assumption that the underlying color samples are in a 4:4:4 color format such as YUV444 or RGB444. Nevertheless, very often, more compact color formats, such as YUV420 and YUV422 have been used. In order to improve the coding performance, various improved palette coding techniques are disclosed in the present invention.

Palette Signaling

With regarding to this aspect, palette prediction related flag, palette size related information and palette sharing related flag can be signaled separately for different components in a coding unit (CU) according to embodiments of the present invention. For example, some of components can share same information related to the palette table except for the palette table itself.

Embodiments of the present invention use multiple palette tables for color video data. Table 3A and Table 3B illustrate an example of separate palette tables (also referred as palettes or color palettes in this disclosure) for luma and chroma components respectively. In Table 3A, each entry in the palette table consists of one luma component. In Table 3B, each entry in the palette table consists of two chroma components.

TABLE 3A

| Color index | Pixel value |
|---|---|
| 0 | Y0 |
| 1 | Y1 |
| 2 | Y2 |
| 3 | Y3 |
| ... | ... |

TABLE 3B

| Color index | Pixel value | |
|---|---|---|
| 0 | Cb0 | Cr0 |
| 1 | Cb1 | Cr1 |
| 2 | Cb2 | Cr2 |
| 3 | Cb3 | Cr3 |
| ... | ... | ... |

In another example, the two chroma components use their individual palette tables as shown in Table 4A and Table 4B for the two chroma components respectively. The palette table for the luma component remains the same as shown in Table 3A. Accordingly, a total of three palette tables are used for each CU in this case.

TABLE 4A

| Color index | Pixel value |
|---|---|
| 0 | Cb0 |
| 1 | Cb1 |
| 2 | Cb2 |
| 3 | Cb3 |
| ... | ... |

TABLE 4B

| Color index | Pixel value |
|---|---|
| 0 | Cr0 |
| 1 | Cr1 |
| 2 | Cr2 |
| 3 | Cr3 |
| ... | ... |

In yet another example, multiple palette tables mentioned above can be used together for a CU. The selected types of palette tables for the multiple color components can be explicitly signaled or pre-defined. For example, a system may use the conventional palette table with three components in each entry as shown in Table 1, as well as one table for the luma component as shown in Table 3A and a table with two chroma component as shown in Table 3B. A flag can be used to indicate which palette table is used for a current CU.

Figure 1:
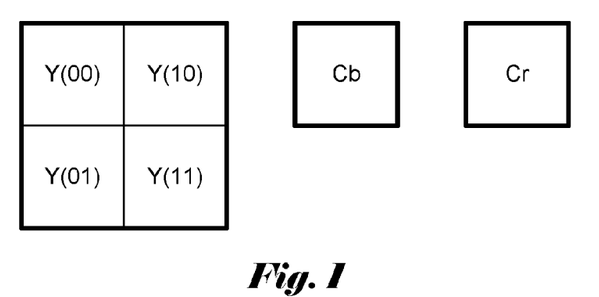
FIG. 1 illustrates the sampling pattern and locations of quad luma samples Y(00), Y(01), Y(10) and Y(11) collocated with each chroma sample for the 4:2:0 color format.

In yet another example, a single palette table can be signaled for each CU in the 4:2:0 color format. Each entry has 6 values consisting of four luma and two chroma (i.e., Cb and Cr) values from the corresponding positions in the 4:2:0 color format. Table 5 shows an example of the palette table with six sample value in each entry for the 4:2:0 color format. The location of Y(00), Y(01), Y(10) and Y(11) are shown in FIG. 1. As shown in FIG. 1, one Cb sample and one Cr sample are associated with a cluster of four adjacent luma (i.e., Y) samples. The cluster of four adjacent luma (i.e., Y) samples is also referred as quad luma samples. The Cb and Cr samples are collocated with the quad luma samples.

TABLE 2

| Color index | Pixel value | | | | | |
|---|---|---|---|---|---|---|
| 0 | Y(00)0 | Y(01)0 | Y(10)0 | Y(11)0 | Cb0 | Cr0 |
| 1 | Y(00)1 | Y(01)1 | Y(10)1 | Y(11)1 | Cb1 | Cr1 |
| 2 | Y(00)2 | Y(01)2 | Y(10)2 | Y(11)2 | Cb2 | Cr2 |
| 3 | Y(00)3 | Y(01)3 | Y(10)3 | Y(11)3 | Cb3 | Cr3 |
| ... | ... | ... | ... | ... | ... | ... |

Figure 2:
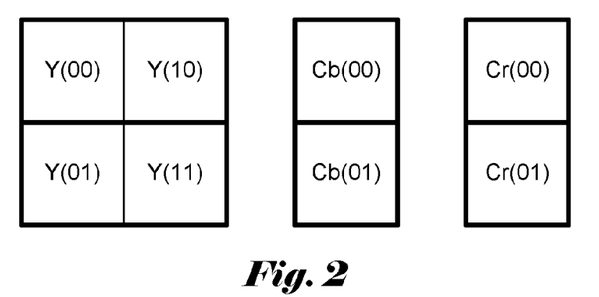
FIG. 2 illustrates the sampling pattern and locations of duo luma samples Y(00) and Y(10), or Y(01) and Y(11) collocated with each chroma sample for the 4:2:2 color format.

In yet another example, one palette table can be signaled for each CU in the 4:2:2 format. Each entry has eight values consisting of four luma and four chroma (i.e., two Cb and two Cr) values from the corresponding positions in the 4:2:2 color format. Table 6 shows an example of the palette table. The location of Y(00), Y(01), Y(10), Y(11), Cb(00), Cb(01), Cr(00) and Cr(01) are shown in FIG. 2. As shown in FIG. 2, one Cb sample and one Cr sample are associated with a cluster of two adjacent luma (i.e., Y(00) and Y(10), or Y(01) and Y(11)) samples. The cluster of two adjacent luma samples is also referred as duo luma samples in this disclosure. The Cb and Cr (e.g. Cb(00)) and Cr (e.g. Cr(00)) samples are collocated with the duo luma samples (e.g. Y(00) and Y(10)).

TABLE 3

| Color index | Pixel value | | | | | | | |
|---|---|---|---|---|---|---|---|---|
| 0 | Y(00)0 | Y(01)0 | Y(10)0 | Y(11)0 | Cb(00)0 | Cb(01)0 | Cr(00)0 | Cr(01)0 |
| 1 | Y(00)1 | Y(01)1 | Y(10)1 | Y(11)1 | Cb(00)1 | Cb(01)1 | Cr(00)1 | Cr(01)1 |
| 2 | Y(00)2 | Y(01)2 | Y(10)2 | Y(11)2 | Cb(00)2 | Cb(01)2 | Cr(00)2 | Cr(01)2 |
| 3 | Y(00)3 | Y(01)3 | Y(10)3 | Y(11)3 | Cb(00)3 | Cb(01)3 | Cr(00)3 | Cr(01)3 |
| ... | ... | ... | ... | ... | ... | ... | ... | ... |

In yet another example, one palette table can be signaled for each CU in the 4:2:0 format. One entry with 3 values for luma component and one entry with 3 values (i.e., Y/Cb/Cr) for luma and chroma components can be interleaved. Table 7 shows an example of the palette table. The location of Y(00), Y(01), Y(10) and Y(11) are shown in FIG. 1.

TABLE 4

| Color index | Pixel value | | |
|---|---|---|---|
| 0 | Y(00)0 | Cb0 | Cr0 |
| 1 | Y(01)0 | Y(10)0 | Y(11)0 |
| 2 | Y(00)1 | Cb1 | Cr1 |
| 3 | Y(01)1 | Y(10)1 | Y(11)1 |
| ... | ... | ... | ... |

In yet another example, one palette table can be signaled for each CU in the 4:2:2 format. Each entry has four values for luma and chroma components. One entry has values for upper two luma positions (i.e., Y(00) and Y(10)) and upper positions of each chroma component (i.e., Cb(00) and Cr(00)). Another entry has values for lower two luma positions (i.e., Y(01) and Y(11)) and lower positions of each chroma component (i.e., Cb(01) and Cr(01)). These two entries can be interleaved. Table 8 shows an example of the palette table with four sample values in each entry. The location of Y(00), Y(01), Y(10), Y(11), Cb(00), Cb(01), Cr(00) and Crb(01) are shown in FIG. 2.

TABLE 5

| Color index | Pixel value | | | |
|---|---|---|---|---|
| 0 | Y(00)0 | Y(10)0 | Cb(00)0 | Cr(00)0 |
| 1 | Y(01)0 | Y(11)0 | Cb(01)0 | Cr(01)0 |
| 2 | Y(00)1 | Y(10)1 | Cb(00)1 | Cr(00)1 |
| 3 | Y(01)1 | Y(11)1 | Cb(01)1 | Cr(01)1 |
| ... | ... | ... | ... | ... |

In yet another embodiment, one palette table can be signaled for each CU. One of every four entries has three valid values for luma component and chroma components. The remaining three of every four entries have only one valid value for the luma component and two default values for the chroma components. Table 9 shows an example of the palette table, where "x" represents the default value for a respective chroma component.

TABLE 6

| Color index | Pixel value | | |
|---|---|---|---|
| 0 | Y0 | Cb0 | Cr0 |
| 1 | Y1 | x | x |

TABLE 6-continued

| Color index | Pixel value | | |
|---|---|---|---|
| 2 | Y2 | x | x |
| 3 | Y3 | x | x |
| ... | ... | ... | ... |

The table values corresponding to "x" are redundant. Accordingly, when the palette is signaled, the pixel value corresponding to "x" does not need to be signaled. Accordingly, one of every four entries has three components to signal and the remaining three of every four entries have only one component to signal as shown in the example of Table 10. When signaling the palette, the entries with three valid component values can be signaled first. After all entries with three valid component values are signaled, the entries with only one valid value in each entry can be signaled. If the maximum number of three-component entries is max- Num and if an index of the palette has a value greater than maxNum, the index indicates that the entry has only one valid component value.

TABLE 10

| Color index | Pixel value | | |
|---|---|---|---|
| 0 | Y0 | Cb0 | Cr0 |
| 1 | Y1 | | |
| 2 | Y2 | | |
| 3 | Y3 | | |
| ... | ... | ... | ... |

Also, one palette table can be signaled for each CU. Each entry of the palette table can has three values corresponding to three components. Table 11 and 12 shows examples of the palette tables for the 420 and 422 color formats respectively with duplicating chroma pixel values.

TABLE 11

| Color index | Pixel value | | |
|---|---|---|---|
| 0 | Y0 | Cb0 | Cr0 |
| 1 | Y1 | Cb0 | Cr0 |
| 2 | Y2 | Cb0 | Cr0 |
| 3 | Y3 | Cb0 | Cr0 |
| ... | ... | ... | ... |

TABLE 12

| Color index | Pixel value | | |
|---|---|---|---|
| 0 | Y0 | Cb0 | Cr0 |
| 1 | Y1 | Cb0 | Cr0 |
| 2 | Y2 | Cb1 | Cr1 |
| 3 | Y3 | Cb1 | Cr1 |
| ... | ... | ... | ... |

Index map coding

Information of each component can be signaled separately. Transpose_flag, sharing_flag and escape flag can be signaled for each component. Transpose_flag is used to indicate whether the transpose process is applied to the associated palette indices of the current coding unit. Sharing_flag is used to indicate whether to two components share a same palette table. Also some of components can share the flags or derive the flags from the flags of other components.

Another aspect of the present invention addresses index map coding to improve the coding efficiency. For example, when there are more than one palette table, the index map for each component can be signaled separately. Therefore each component has its own run type, index, run length and escape values. Also two index maps for the luma component and chroma components can be signaled. In this case, the two chroma components share one index map. Also, all of components can share one index map. The pseudo-code for each case can be described as follows.

EXAMPLE 1

One Index Map for All Components

```
For(i<CUsize)
{
  run_type;
  index (if needed)
  run length
  escape values (if needed)
  i+=run_length
}
```

EXAMPLE 2

One Index Map for the Luma Component and One Index Map for the Chroma Components

```
for(ch<2)
{
  For(i<CUsize)
  {
    run_type[ch];
    index[ch] (if needed)
    run length [ch]
    escape values [ch] (if needed)
    i+=run_length
  }
}
```

EXAMPLE 3

One Index Map for Each Component

```
for(ch<# of components)
{
  For(i<CUsize)
  {
    run_type[ch];
    index[ch] (if needed)
    run length [ch]
    escape values [ch] (if needed)
    i+=run_length
  }
}
```

In another embodiment, all components or some of components can share run type and run length. More than one index maps may be used for the components. In this case, each component can have its own index map. Otherwise, color components can share one index map. The pseudo-code for each case can be described as follows.

EXAMPLE 1

One Index Map for All Component

```
For (i<CUsize)
{
  run_type;
  index (if needed)
  run length
  escape values (if needed)
}
```

EXAMPLE 2

One Index for the Luma Component and One Index for the Chroma Components

```
For(i<CUsize)
{
run_type;
index_luma (if needed)
index_chroma (if needed)
run length
escape values (if needed)
}
```

EXAMPLE 3

One Index for Each Component

```
For(i<CUsize)
{
run_type;
for(ch < # of components)
    index[ch] (if needed)
run length
escape values (if needed)
}
```

When only one palette table with six values in each entry is used, one index can be assigned to quad luma samples and one Cb chroma sample and one Cr chroma sample collocated with the quad luma samples. Therefore, samples at Y0, Y1, Y2, Y3, Cb0 and Cr0 can share one index and samples at Y4, Y5, Y6, Y7, Cb1 and Cr1 can share another index as shown in FIG. 3.

Figure 3:
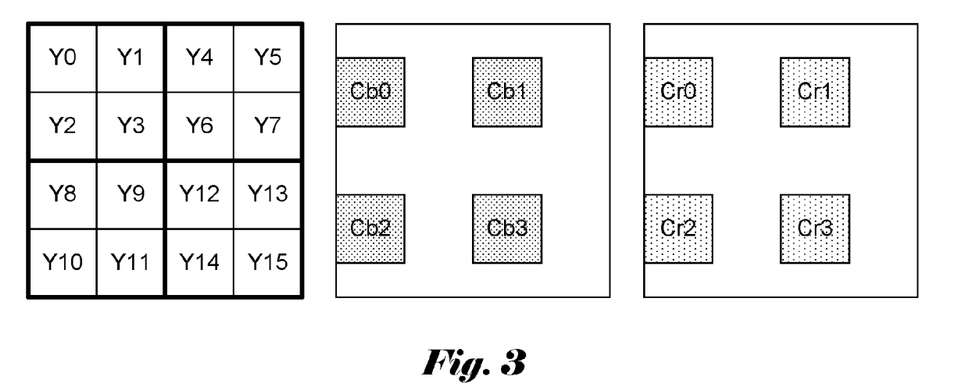
FIG. 3 illustrates an example of the sampling pattern and locations of luma samples and chroma samples for the 4:2:0 color format.

When only one palette table with three values in each entry is used, each chroma position corresponds to four luma positions as FIG. 3 for the 4:2:0 format, where each thick square consists of a set of four luma samples associated with one chroma position. Since each luma position has its own index, one chroma position corresponds to four indices. In this case, the index imposed on the chroma position is shown as follows.

1. The index can be one of four indices assigned to luma locations. In FIG. 3, the index of Cb0 (or Cr 0) can be any index of Y0, Y1, Y2 and Y3. Similarly, the index of Cb1 (or Cr 1) can be any index of Y4, Y5, Y6 and Y7.
2. The index can be the smallest, the largest, or the median index of four indices assigned to luma locations. In FIG. 3, the index of Cb0 (or Cr 0) can be the smallest, the largest, or the median index among Y0, Y1, Y2 and Y3. Similarly, the index of Cb1 (or Cr 1) can be the smallest, the largest, or the median index among Y4, Y5, Y6 and Y7.

These methods mentioned above can be applied to the 4:2:2 color format. For the 4:2:2 format, since each luma position has its own index, two chroma positions correspond to four indices. In this case the index imposed on chroma positions shown as follows.

Figure 4:
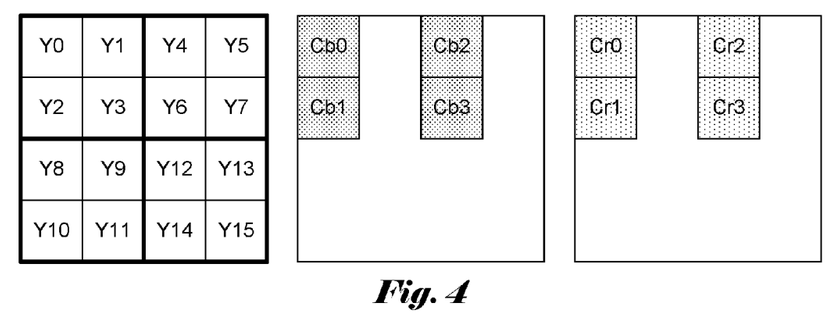
FIG. 4 illustrates an example of the sampling pattern and locations of luma samples and chroma samples for the 4:2:2 color format.

1. Two chroma positions can share one index. In FIG. 4, the indices of Cb0 and Cb1 can be same. The method to derive the index can be same as the 4:2:0 format case.
2. The index can be one of two indices assigned to luma locations. In FIG. 4, the index of Cb0 (or Cr0) can be either index of Y0 or Y1. The index of Cb1 (or Cr1) can also be either index of Y2 or Y3.
3. The indices can be two smallest indices, two largest indices or two indices around median of four indices assigned to the luma locations. In FIG. 4, the index of Cb0 (or Cr0) can be the smallest, the largest or the median index among Y0, Y1, Y2 and Y3. The index of Cb1 (or Cr1) can be the second smallest, the second largest or the second median index of Y0, Y1, Y2 and Y3.

Reconstruction of Pixel Values for Chroma Pixels

If a component has its own index map, the value can be reconstructed from the palette table based on the index. The palette table that each component uses can be pre-determined or explicitly signaled. If a CU has only one palette, every component will use this palette table. If a CU has more than one palette, each component can use the palette table corresponding to the component. Also, the palette table used for a selected component can be signaled. For example, the Cb component can use the palette table that is signaled for the luma component.

In the case of 4:2:0 color format, if an index is shared by the luma and chroma components, four chroma values can be reconstructed for one corresponding chroma location collocated with the four luma values. In this case the value for the chroma pixel can be as following:

1. The value can be one of four chroma values corresponding to luma locations. For example, the value of Cb0 (or Cr0) can be one of the Cb (or Cr) values assigned to the locations Y0, Y1, Y2 and Y3.
2. The value can be smallest, the largest or the average value among four chroma values corresponding to luma locations. For example, the value of Cb0 (or Cr0) can be smallest, the largest or the median value among those Cb (or Cr) values assigned to the locations of Y0, Y1, Y2 and Y3.
3. The value can be the average value of two chroma values corresponding to the luma samples at the upper-left and upper-right locations or at the lower-left and lower-right locations of the quad luma samples. For example, the value of Cb0 (or Cb1) can be average value of those Cb (or Cr) values assigned to the locations of Y0 and Y1 or the locations of Y2 and Y3.
4. The value can be the average value of two chroma values corresponding to the luma samples at the upper-left and lower-left locations or the upper-right and lower-right locations of the quad luma samples. For example, the value of Cb0 (or Cb1) can be average value of those Cb (or Cr) values assigned to the locations Y0 and Y2 or the locations Y1 and Y3.

Figure 5:
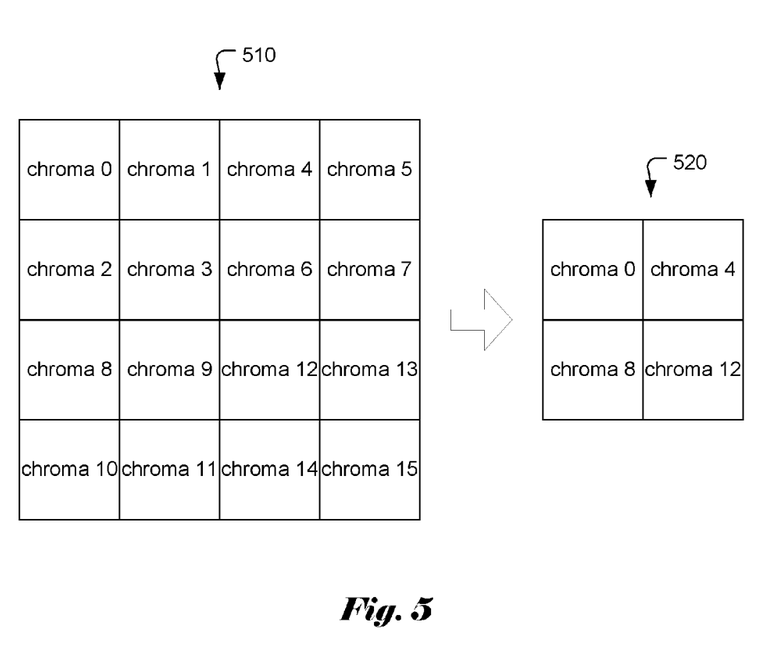
FIG. 5 illustrates an example of the down sampling process to reconstruct the chroma samples from up-sampled chroma samples for the 4:2:0 format.

As mentioned above, for the 4:2:0 format video, the luma component and chroma components will share one index map. To reconstruct the luma value, the index in the current luma value location will be used to reconstruct the luma pixel value. To reconstruct the chroma value, the current chroma value location will be mapped to the index location. The index value in the mapped location will be used to reconstruct the chroma pixel value. In the other words, the chroma reconstruction pixels will be derived using the index map. Down sampling is then performed to obtain the chroma reconstruction pixel. FIG. 5 illustrates an example of chroma sample down sampling to obtain the chroma samples for the 4:2:0 format, where chroma samples 510 are down samples to chroma samples 520.

Due to the down sample process, the chroma value in some positions will be discarded. When the pixel is an escape index, the encoder or decoder will use the escape value of the three components to reconstruct the current pixel if the escape occurs in certain locations. While in other locations, the encoder or decoder will only use the luma escape value to reconstruct the luma pixel. For example, if index at location 0 represents an escape index, the luma reconstructed value and chroma reconstructed value are reconstructed from the escape value at location 0. If index at location 1 represents an escape index, the luma value is reconstructed from the escape value at location 1, while the chroma value might from color table. In one embodiment, the chroma reconstructed value will be from the escape value if any one of index0, index1, index2, index3 corresponds to an escape index.

The methods disclosed above can also be applied to the 4:2:2 format video. For the 4:2:2 format, four chroma values can be reconstructed for two chroma locations corresponding to four luma locations. In this case the value for the chroma pixels can be as following :

1. The values for two chroma pixels can be same. For example, the value of Cb0 and Cb1 are the same in FIG. 4. The method to derive the index can be same as the case for the 4:2:0 format.
2. The value can be one of the four chroma values corresponding to quad luma locations. For example, the value of Cb0 (or Cr0) can be one of the Cb (or Cr) values assigned to the locations of Y0, Y1, Y2 and Y3. The value of Cb1 (or Cr1) can be one of the Cb (or Cr) values assigned to the locations of Y0, Y1, Y2 and Y3.
3. The value can be two smallest values or two largest values among the four chroma values corresponding to luma locations. For example, the value of Cb0 (or Cr0) can be the smallest or the largest Cb (or Cr) value among those Cb (or Cr) values assigned to the locations of Y0, Y1, Y2 and Y3. The value of Cb1 (or Cr1) can be second smallest or second largest Cb (or Cr) value among those Cb (or Cr) values assigned to the locations of Y0, Y1, Y2 and Y3.
4. The value can be the average value of two chroma values corresponding to the luma samples at the upper-left and upper-right locations or the lower-left and lower-right locations of the quad luma samples. For example, the value of Cb0 (or Cr0) can be average Cb (or Cr) value of those Cb (or Cr) values assigned to the locations of Y0 and Y1. The value of Cb1 (or Cr1) can be average Cb (or Cr) value of those Cb (or Cr) values assigned to the locations of Y2 and Y3.
5. The value can be the average value of two chroma values corresponding to the luma samples at the upper-left and lower-left locations or the upper-right and lower-right locations of the quad luma samples. For example, the value of Cb0 (or Cr0) can be average Cb (or Cr) value of those Cb (or Cr) values assigned to the locations of Y0 and Y2. The value of Cb1 (or Cr1) can be average Cb (or Cr) value of those Cb (or Cr) values assigned to the locations of Y1 and Y3.

Derivation of Palette Table and Index Map

Figure 6:
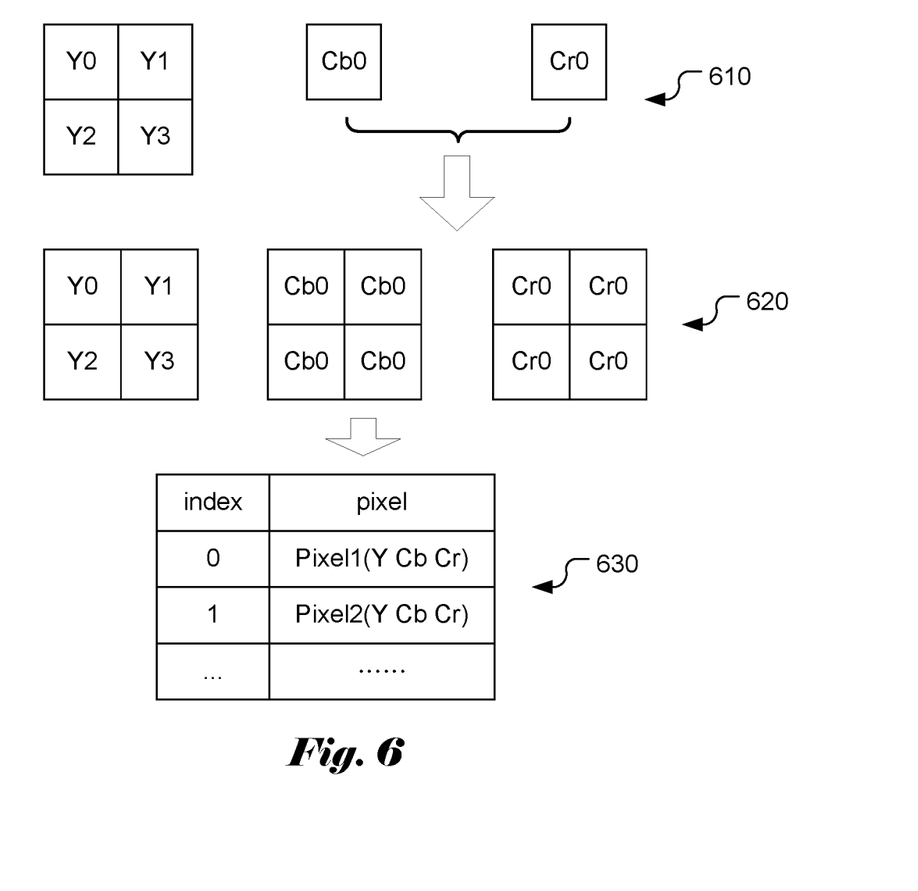
FIG. 6 illustrates an example of padding the chroma samples to the full spatial resolution as the luma samples and generating a single color palette based on the luma samples and the up-sampled chroma samples for the 4:2:0 format.
Figure 7:
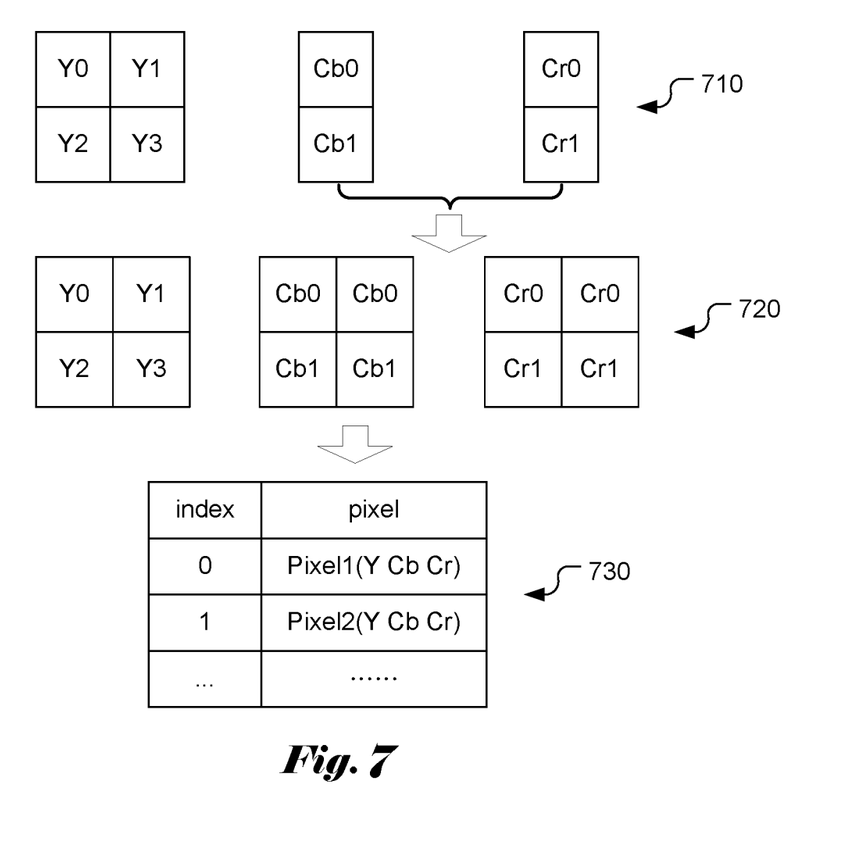
FIG. 7 illustrates an example of padding the chroma samples to the full spatial resolution as the luma samples and generating a single color palette based on the luma samples and the up-sampled chroma samples for the 4:2:2 format.

The current invent addresses yet another aspect of palette mode coding, i.e., derivation of palette table and index map. In one embodiment, for the 4:2:0 or 4:2:2 color format, the encoder will up-sample the video to the 4:4:4 format to derive the color palette table and calculate the color index. For each CU, the Cb and Cr components are up-sampled to derive the color palette table as shown in FIG. 6 and FIG. 7. As illustrated in FIG. 6, the original luma and chroma samples for the 4:2:0 format is indicated by reference number 610 in FIG. 6. The up-sampled chroma values corresponding to luma locations at Y1, Y2 and Y3 is padded with Cb0 and Cr0 as indicated by reference number 620 in FIG. 6. In other embodiment, the up-sampled chroma values corresponding to luma locations at Y1, Y2 and Y3 can be a predefined value, N. Therefore, the encoder/decoder can use the Y/Cb/Cr three components to calculate the distance between a current pixel and the pixel in the color palette during deriving the index map as indicated by reference number 630 for each CU in FIG. 6. This up-sampling process can be performed on the fly and based on each CU. FIG. 7 illustrates an example for the 4:2:2 format. The original luma and chroma samples for the 4:2:2 format is indicated by reference number 710 in FIG. 7. The up-sampled chroma values are Cb0/Cb1 and Cr0/Cr1 as indicated by reference number 720 in FIG. 7. The encoder/decoder can use the Y/Cb/Cr three components to calculate the distance between a current pixel and the pixel in the color palette during deriving the index map as indicated by reference number 730 for each CU in FIG. 7.

For each CU, the Cb and Cr components are up-sampled to derive the color index. One index map is generated, and the size of the index map is the same as the luma component size. In the current HEVC test-model software, the calculation of distance between a current pixel and the color from the palette table is based on the sum of the absolute difference of individual color components between the current pixel and a color in the palette.

According to an embodiment of the present invention, the encoder applies different weights on the luma component and the chroma component for calculating the distance between a current pixel and the color in the palette. In particular, weighting factor, Luma Weight for the luma component is applied to the absolute difference of the luma component between the current pixels and a color in the palette. Another weighting factor, Total Weight is applied to the sum of weighted absolute luma difference and un-weighted absolute chroma differences.

Escape Value Coding

When the escape flag is true, the escape value will be signaled for an underlying pixel. In one embodiment for the 4:2:0 format, the actual escape pixel value in the current location will be signaled. In other words, three components will be signaled one by one. For example, when the escape flag at location 0 is true, pixel values for Y0, Cb0 and Cr0 will be signaled. When the escape flag at location 1 is true, pixel values for Y1, Cb0 and Cr0 will be signaled.

In another embodiment, the three components will all be signaled at certain escape locations. In other escape locations, only luma component will be signaled. Since four luma values share the same chroma value, there is no need to signal the chroma values for three positions. For example, when the escape flag at location 0 is true, pixel values for Y0, Cb0 and Cr0 are signaled. When the escape flag at location 1 is true, only pixel value for Y1 will be signaled. The reconstructed Cb and Cr values for Y1 will be derived based on Cb0 and Cr0 in the reconstruction stage. The escape value coding method as mentioned above can also be applied to 4:2:2 format.

An exemplary palette coding syntax incorporating the above embodiment of escape value coding is shown in Table 13. As shown in Table, an escape value as indicated by Note (13-2) in included when any of the conditions in Note (13-1) are satisfied. The condition "ChromaArrayType=3" corresponds to the 4:4:4 format and all color samples are signaled. The condition "cIdx=0" corresponds to the luma sample, which is always signaled. The condition "( xC%2==0 && ChromaArrayType==2 && !palette_transpose_flag)||(yC%2==0&& ChromaArrayType==2&& palette_transpose_flag)" corresponds to the 4:2:2 format and the chroma samples at positions corresponding to Y(00) and Y(01) in FIG. 2 will be signaled. The condition "xC%2 ==0&& yC%2==0&& ChromaArrayType==1" corresponds to the 4:2:0 format and the chroma samples at positions corresponding to Y(00) in FIG. 1 will be signaled.

TABLE 13

| palette_coding( x0, y0, nCbS ) { | Note |
|---|---|
|   palette_share_flag[ x0 ][ y0 ] | |
|   ... | |
|     for( cIdx = 0; cIdx < 3; cIdx++ ) { | |
|     if( ChromaArrayType ==3 \|\| cIdx ==0 \|\| ( xC%2 == 0 && ChromaArrayType == 2 && !palette_transpose_flag)\|\| ( yC%2 == 0 && ChromaArrayType == 2 && palette_transpose_flag )\|\|( xC%2 == 0 && yC%2 == 0 && ChromaArrayType ==1 ) ) | (13-1) |
|     { | |
|       palette_escape_val<br>      PaletteEscapeVal[ cIdx ][ xR ][ yR ] =<br>      palette_escape_val | (13-2) |
|     } | |
|   } | |
|   ... | |
| } | |

Syntax Associated with Palette Coding Mode

In JCTVC-T0062 (Pu, et al., "*Non 4:4:4 Palette Mode: AhG Way*", Joint Collaborative Team on Video Coding (JCT-VC) of ITU-T SG 16 WP 3 and ISO/IEC JTC 1/SC 29/WG 11, 20th Meeting: Geneva, CH, 10-18 February 2015, Document: JCTVC-T0062), a new palette coding for non 4:4:4 chroma subsampling is disclosed, where luma and chroma samples are coded separately for each palette mode CU. Two palettes are generated for luma and chroma components. These palettes are used to code the corresponding luma and chroma index blocks, respectively.

For example, there are two separate palette predictor lists maintained for the luma and chroma components. Luma and chroma components have their individual scanning directions (i.e., palette_transpose_flag), escape pixel presence flags, and palette share flag values (i.e., palette_share_flag), The corresponding syntax is in Table 14, where text in the same row with Note (14-1) indicates deleted text (i.e.,"ChromaArrayType ==3&& "). In Table 14, the test regarding whether palette mode is enabled (i.e., palette_mode_enabled_flag), whether the current prediction mode is Intra prediction mode (i.e., CuPredMode[x0][y0] ==MODE_INTRA), and whether the IntraBC flag is not asserted (i.e., !intra_bc_flag[x0][y0]) is performed as indicated by Note (14-1) in Table 1. The test regarding whether ChromaArrayType is equal to 3 (i.e., the 4:4:4 color format) is excluded in the above test. If the test in Note (14-1) is asserted, a palette mode flag (i.e., palette_mode_flag[x0][y0]) is included as indicated by Note (14-2). Whether the palette mode flag is set is tested as shown in Note (14-3). If the palette mode flag is equal to 1, whether ChromaArrayType is equal to 0 or 3 (i.e., 4:4:4 format) is tested as shown in Note (14-4). If the result is asserted, palette coding is applied to luma and chroma components using a joint palette as indicated by Note (14-5). Otherwise, separate palettes are used for the luma and chroma components as indicated by Notes (14-6) and (14-7) respectively.

TABLE 14

| coding_unit( x0, y0, log2CbSize ) { | Note |
|---|---|
|   ... | |
|   if( palette_mode_enabled_flag &&<br>    ChromaArrayType = = 3 &&<br>    CuPredMode[ x0 ][ y0 ] = = MODE_INTRA &&<br>    !intra_bc_flag[ x0 ][ y0 ] ) | (14-1) |
|     palette_mode_flag[ x0 ][ y0 ] | (14-2) |
|   if( palette_mode_flag[ x0 ][ y0 ] ) { | (14-3) |
|     if( ChromaArrayType = = 0 \|\| ChromaArrayType = = 3 ) | (14-4) |
|       palette_coding( x0, y0, nCbS, ChromaArrayType ) | (14-5) |
|     else { | |
|       palette_coding( x0, y0, nCbS, 1 ) | (14-6) |
|       palette_coding( x0, y0, nCbS, 2 ) | (14-7) |
|     } | |
|   } else { | |
|   ... | |

First embodiment: Y/Cb/Cr Palette Coding Mode for Non-444 Format

As mentioned before, according to one embodiment, Y, Cb and Cr components are coded separately with three separate palettes. Each entry of the palette represents only one component and each component has its own palette table and index map. Related flags such as palette_share_flag, palette_transpose_flag, palette_escape_val and etc. are coded separately for each component.

Sequence parameter set (SPS) semantics related to palette coding are also separated for each component:

palette_max_size[cIdx]: specifies the maximum allowed palette size for the color component specified by cIdx. When not present, the value of palette_max_size[cIdx] is inferred to be 0.

palette_max_predictor_size[cIdx]: specifies the maximum predictor palette size for the color component specified by cIdx. When not present, the value of palette max_predictor_size[cIdx] is inferred to be 0.

In one embodiment, sequence parameter set semantics can be the same for the three components in non-444 format. Syntax elements, palette_max_size and palette max_predictor_size can be used to specify the maximum palette size and the maximum predictor palette size for Y, Cb, and Cr components.

In another embodiment, sequence parameter set semantics is separate for luma and chroma components in the non-444 format. Syntax elements, palette_luma_max_size and palette_luma_max_predictor_size can be used to specify the maximum palette size and the maximum predictor palette size for luma component. Syntax elements, palette_chroma_max_size and palette_chroma_max_predictor_size can be used to specify the maximum palette size and the maximum predictor palette size for Chroma components.

In another embodiment, if palette_max_size or palette_max_predictor_size for chroma components is a predefined value such as 0 and palette_max_size or palette_max_predictor_size for luma components is not zero, it implies that the values of palette_max_size or palette_max_predictor_size are the same as those of luma component.

The update process of palette predictor can be also separate for the color component specified by cIdx. Changes have to be made in the palette predictor update process in order to incorporate this embodiment. Compared to the conventional update process that updates only one palette table, the update process to support this embodiment updates individual palettes and individual palette predictors for separate color component.

EXAMPLE 1

Aligning Palette Coding for 444 Format and Non-444 Format

In one embodiment, the above separate coding color component scheme can be extended to 444 format. For both 444 and non-444 formats, three components are coded in palette mode separately. For monochrome content, only Y component is coded. Table 15 illustrates an exemplary coding unit syntax incorporating the embodiment. The decision regarding whether to include the palette mode flag (i.e., palette_mode_flag[x0][y0]) as shown in Note (15-1) is the same as that in Table 14 (i.e., Note (14-1)). If the palette mode flag is 1 (i.e., Note (15-2)), palette coding is always applied to luma or monochrome component as indicated by Note (15-3). For the 4:2:0, 4:2:2 and 4:4:4 color formats as indicated by Note (15-4), palette coding is also applied to chroma components as indicated by Note (15-5) and (15-6).

TABLE 15

| coding_unit( x0, y0, log2CbSize ) { | Note |
|---|---|
| ... | |
|   if( palette_mode_enabled_flag && | (15-1) |
|   ChromaArrayType == 3 && | |
|     CuPredMode[ x0 ][ y0 ] == MODE_INTRA && | |
|     !intra_bc_flag[ x0 ][ y0 ] ) | |
|     palette_mode_flag[ x0 ][ y0 ] | |
|   if( palette_mode_flag[ x0 ][ y0 ] ) { | (15-2) |
|     palette_coding( x0, y0, nCbS, 0 ) | (15-3) |
|     if( ChromaArrayType > 0 ) { | (15-4) |
|       palette_coding( x0, y0, nCbS, 1 ) | (15-5) |
|       palette_coding( x0, y0, nCbS, 2 ) | (15-6) |
|     } | |
|   } else { | |
| ... | |

EXAMPLE 2

Dynamic Palette Coding for the 444 and Non-444 Formats

In another embodiment, for non-444 format, the three component are coded in palette mode separately. Three palette tables and idex maps are generated. Each entry in the palette table represents one component. For a monochrome content, only Y component is coded. For the 444 format, three components are coded together. Therefore, one palette table and one index map will be generated. Each enry in the palette table represents three components. An exemplary syntax is illustrated in Table 16. The syntax in Table 16 is substantially the same as the syntax in Table 15 except for the test as indicated by Note (15-4). In Table 16, the test "if (ChromaArrayType>0 && ChromaArrayType<3)" is performed as indicated in Note (16-1).

TABLE 16

| coding_unit( x0, y0, log2CbSize ) { | Note |
|---|---|
| ... | |
|   if( palette_mode_enabled_flag && | |
|   ChromaArrayType == 3 && | |
|     CuPredMode[ x0 ][ y0 ] == | |
|     MODE_INTRA && !intra_bc_flag[ x0 ][ y0 ] ) | |
|     palette_mode_flag[ x0 ][ y0 ] | |

TABLE 16-continued

| coding_unit( x0, y0, log2CbSize ) { | Note |
|---|---|
|   if( palette_mode_flag[ x0 ][ y0 ] ) { | |
|     palette_coding( x0, y0, nCbS, 0 ) | |
|     if( ChromaArrayType > 0 && ChromaArrayType < 3 ) { | (16-1) |
|       palette_coding( x0, y0, nCbS, 1 ) | |
|       palette_coding( x0, y0, nCbS, 2 ) | |
|     } | |
|   } else { | |
| ... | |

Second embodiment: Separate QP Adjustment Flag for Escape Coded Chroma Sample.

In the above methods, Cb and Cr components share the same syntax elements cu_chroma_qp_palette_offset_flag and cu_chroma_qp_palette_offset_idx. Syntax element cu_chroma_qp_palette_offset_flag is related to derivation of offset values for quantization parameters (QP) for Cb and Cr components. Syntax element cu_chroma_qp_palette_offset_idx specifies the index into the QP offset lists for Cb and Cr components. In one embodiment, Cb and Cr component can have separate flags for QP adjustment. For example, four flags including cu_cb_qp_palette_offset_flag, cu_cb_qp_palette_offset_idx, cu_cr_qp_palette_offset_flag, cu_cr_qp_palette_offset_idx representing the QP offset flags and indices for the Cb and Cr components can be signaled to specify the QP adjustment for chroma escape. Two examples are shown in Table 17 and Table 18. In Table 17, these four flags are incorporated as indicated by Notes (17-1), (17-2), (17-3) and (17-4). In Table 18, these four flags are incorporated as indicated by Notes (18-1), (18-2), (18-3) and (18-4).

TABLE 17

| palette_coding( x0, y0, nCbS, cIdx ) { | Note |
|---|---|
| ... | |
|   if( cIdx == 1 && cu_chroma_qp_offset_enabled_flag | |
|   && !IsCuChromaQpOffsetCoded ) { | |
|     cu_cb_qp_palette_offset_flag | (17-1) |
|     if( cu_cb_qp_offset_flag && | |
|     chroma_qp_offset_list_len_minus1 > 0) | |
|       cu_cb_qp_palette_offset_idx | (17-2) |
|   } | |
|   if( cIdx == 2 && cu_chroma_qp_offset_enabled_flag | |
|   && !IsCuChromaQpOffsetCoded ) { | |
|     cu_cr_qp_palette_offset_flag | (17-3) |
|     if( cu_cr_qp_offset_flag && | |
|     chroma_qp_offset_list_len_minus1 > 0) | |
|       cu_cr_qp_palette_offset_idx | (17-4) |
|   } | |
| ... | |
| } | |

TABLE 18

| palette_coding( x0, y0, nCbS, cIdx ) { | Note |
|---|---|
| ... | |
|   if( (cIdx == 1 || ChromaArrayType == 3 ) && | |
|   cu_chroma_qp_offset_enabled_flag && | |
|   !IsCuChromaQpOffsetCoded ) { | |
|     cu_cb_qp_palette_offset_flag | (18-1) |
|     if( cu_cb_qp_offset_flag && | |
|     chroma_qp_offset_list_len_minus1 > 0) | |
|       cu_cb_qp_palette_offset_idx | (18-2) |
|   } | |

TABLE 18-continued

| palette_coding( x0, y0, nCbS, cIdx ) { | Note |
|---|---|
|     if(( cIdx == 2\|\| ChromaArrayType == 3 )&&<br>    cu_chroma_qp_offset_enabled_flag &&<br>    !IsCuChromaQpOffsetCoded ) { | |
|         cu_cr_qp_palette_offset_flag | (18-3) |
|         if( cu_cr_qp_offset_flag &&<br>        chroma_qp_offset_list_len_minus1 > 0) | |
|             cu_cr_qp_palette_offset_idx | (18-4) |
|     }<br>    ....<br>} | |

Third Embodiment: PPS/SPS/CU Flag for Information Sharing Among Color Components In picture parameter set (PPS) or sequence parameter set (SPS), a palette information sharing flag for color components can be signaled to indicate whether the above mentioned palette information is shared among three color components or not. The palette information is related to palette coding (e.g. palette_max_size, palette_max_predictor_size and palette_share_flag), palette predictor (e.g. palette_predictor_run and palette_num_signalled entries), palette_escape_val_present_flag, cu_qp_delta_palette_abs, cu_qp_delta_palette_sign_flag and palette_transpose_flag.

If the palette information sharing flag is true, information described in above methods is signaled only once for all color components. Luma and chroma components may have the same value for palette_max_size, palette_max_predictor_size, palette_share_flag, palette_predictor related information (e.g. palette_predictor_run, palette_num_signalled_entries), palette_escape_val_present_flag, cu_qp_delta_palette_abs, cu_qp_delta_palette_sign_flag and palette_transpose_flag, which are signaled once. With the information mentioned, one combined palette table and one combined index map can be generated. Also separate palette tables can be used. Otherwise (i.e., the palette information sharing flag being false), palette information described above can be signaled for each color component. In this case, luma and chroma component have their own palette_max_size, palette_max_predictor_size, palette_share_flag, palette_predictor related information (e.g. palette_predictor_run, palette_num_signalled_entries), palette_escape_val_present_flag, cu_qp_delta_palette_abs, cu_qp_delta_palette_sign_flag and palette_transpose_flag, which are signaled separately. Each component will have its own palette table and index map.

Regardless whether the palette information sharing flag is true or false, information related to palette coding in sequence parameter set such as palette_max_size and palette_max_predictor_size can be signaled separately.

Also with the palette information sharing flag, some of information for index map, such as run_type, palette_run_msb_id_plus1, palette_run_refinement_bits can be shared when each component has separate index map.

The palette information sharing flag can be signaled for each CU. For each CU, information related to palette coding can be signaled separately for each component or signaled once for each CU and shared among all components in the CU if the palette information sharing flag has a value of 1.

In the above discussion, luma and chroma components are always used as color sub-sampling format examples (e.g. 444, 422 and 420 formats) to illustrate palette coding according to embodiment of the present invention. However, the present invention can also be applied to color video with a first color component (e.g. Y or G component) and one or more second-color components (e.g. Cb/Cr or B/R).

Figure 8:
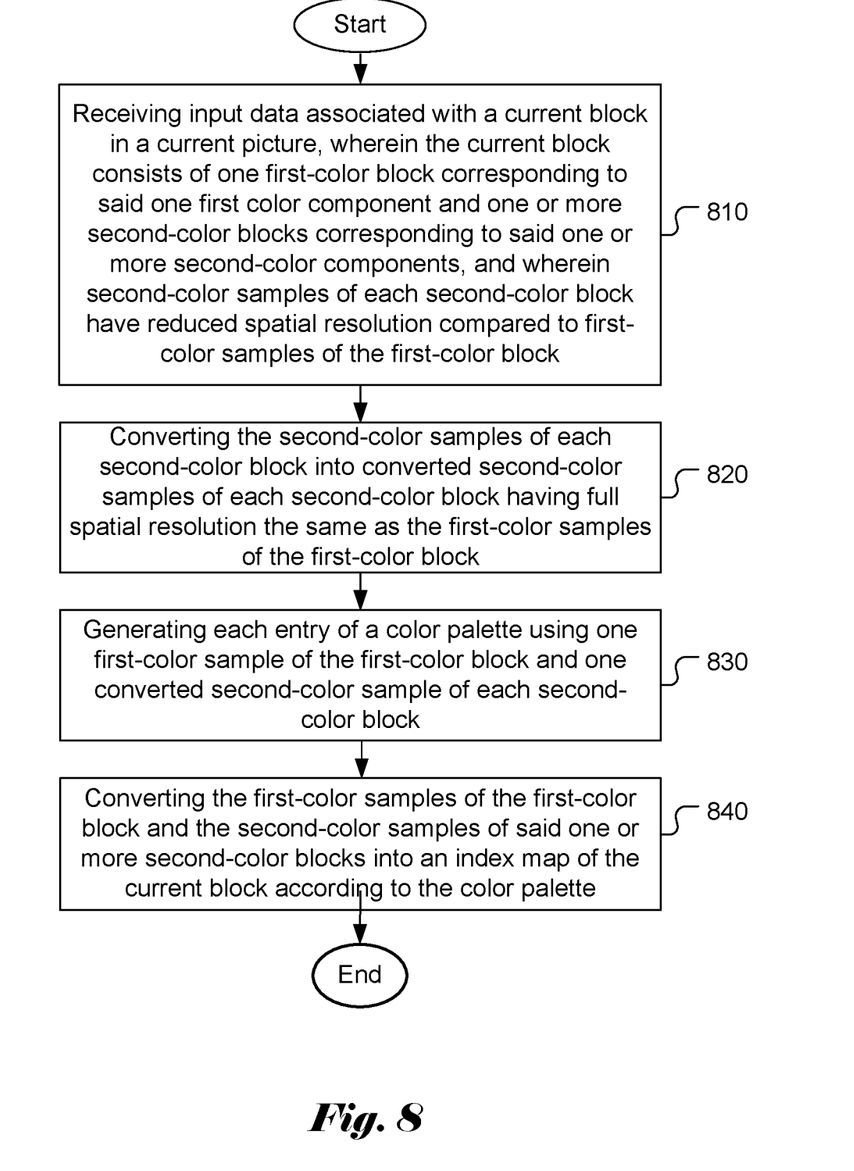
FIG. 8 illustrates an exemplary flowchart for a coding system incorporating palette coding according to an embodiment of the present invention.

FIG. 8 illustrates an exemplary flowchart for a coding system incorporating palette coding according to an embodiment of the present invention. The system receives input data associated with a current block in a current picture in step 810, where the current block consists of one first-color block corresponding to first color component and one or more second-color blocks corresponding to one or more second-color components. Second-color samples of each second-color block have reduced spatial resolution compared to first-color samples of the first-color block. The input data may correspond to pixel data of the current block to be coded. The current block may be retrieved from storage such as a computer memory of buffer (RAM or DRAM). The video bitstream may also be received from a processor such as a processing unit or a digital signal. The second-color samples of each second-color block are converted into converted second-color samples of each second-color block having full spatial resolution the same as the first-color samples of the first-color block in step 820. Each entry of a color palette is generated using one first-color sample of the first-color block and one converted second-color sample of each second-color block in step 830. The first-color samples of the first-color block and the second-color samples of said one or more second-color blocks are converted into an index map of the current block according to the color palette in step 840.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics.

The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding using a palette coding mode for color video in a non-444 color format, wherein the color video consists of one first-color component and one or more second-color components, the method comprising:

receiving input data comprising color video in the non-444 color format, the input data being associated with a current block in a current picture, wherein the current block consists of one first-color block corresponding to said one first-color component and one or more second-color blocks corresponding to said one or more second-color components, and wherein second-color samples of each second-color block have reduced spatial resolution compared to first-color samples of the first-color block;

converting the second-color samples of each second-color block into converted second-color samples of each second-color block having full spatial resolution the same as the first-color samples of the first-color block;

generating each entry of a color palette using one first-color palette sample of the first-color component and one converted second-color palette sample of each second-color component; and converting the first-color samples of the first-color block and the second-color samples of said one or more second-color blocks into an index map of the current block according to the color palette.

2. The method of claim 1, wherein the first-color component corresponds to a luma component; said one or more second-color components correspond to a first chroma component and a second chroma component; and the current block includes a luma block consisting of luma samples, a first chroma block consisting of first chroma samples and a second chroma block consisting of second chroma samples, and the converted second-color samples of each second-color block correspond to converted first chroma samples of the first chroma block and converted second chroma samples of the second chroma block.

3. The method of claim 2, wherein if the non-444 color format corresponds to a 4:2:0 color format, each first chroma sample and each second chroma sample collocated with corresponding quad luma samples are padded with three first chroma samples and three second chroma samples respectively to form converted quad first chroma samples and converted quad second chroma samples.

4. The method of claim 2, wherein if the non-444 color format corresponds to a 4:2:2 color format, each first chroma sample and each second chroma sample collocated with corresponding duo luma samples are padded with one first chroma sample and one second chroma sample respectively to form converted duo first chroma samples and converted duo second chroma samples.

5. The method of claim 2, wherein if the non-444 color format corresponds to a 4:2:0 color format and if a current pixel consisting of one luma sample, one converted first chroma sample and one converted second chroma sample does not belong to the color palette, then one or more escape values are signaled for the current pixel and said one or more escape values associated with said one converted first chroma sample and said one converted second chroma sample are not signaled for three of quad first chroma sample locations and three of quad second chroma sample locations collocated with corresponding quad luma samples.

6. The method of claim 2, wherein if the non-444 color format corresponds to a 4:2:2 color format and if a current pixel consisting of one luma sample, one converted first chroma sample and one converted second chroma sample does not belong to the color palette, then one or more escape values are signaled for the current pixel and said one or more escape values associated with said one converted first chroma sample and said one converted second chroma sample are not signaled for one of duo first chroma sample locations and one of duo second chroma sample locations collocated with corresponding duo luma samples.

7. The method of claim 2, wherein said converting the second-color samples of each second-color block adds padded samples with a default value to the second-color samples of each second-color block to form the converted second-color samples of each second-color block having the full spatial resolution the same as the first-color samples of the first-color block.

8. A method of video decoding using a palette coding mode for color video in a non-444 color format, wherein the color video consists of one first-color component and one or more second-color components, the method comprising:

receiving video bitstream comprising color video in the non-444 color format, the video bitstream including coded data associated with a current block in a current picture, wherein the current block consists of one first-color block corresponding to said one first-color component and one or more second-color blocks corresponding to said one or more second-color components;

deriving a color palette from the video bitstream, wherein each entry of the color palette consists of one first-color palette sample of the first-color component and one second-color palette sample of each second-color component;

converting an index map of the current block into first-color samples of the first-color block and second-color samples of said one or more second-color blocks according to the color palette, wherein the second-color samples of each second-color block have full spatial resolution the same as the first-color samples of the first-color block for decoding; and recovering the current block by discarding some second-color samples at the full spatial resolution to reduce to reduced spatial resolution, wherein the second-color samples of each second-color block after the discarding operation have the reduced spatial resolution compared to the first-color samples of the first-color block.

9. A method of video coding using a palette coding mode for color video in a non-444 color format, wherein the color video consists of one first-color component and one or more second-color components, the method comprising:

receiving input data comprising color video in the non-444 color format, the input data being associated with a current block in a current picture, wherein the current block consists of one first-color block corresponding to said one first-color component and one or more second-color blocks corresponding to said one or more second-color components, and wherein said one or more second-color blocks have reduced spatial resolution compared to said one first-color block;

generating a color palette for the current block by regrouping color samples of the current block to include color samples from more than one sample locations for at least one entry of the color palette or to include different numbers of samples for at least two entries of the color palette at an encoder side or parsing the color palette including color samples from more than one sample locations for at least one entry of the color palette or including different numbers of samples for at least two entries of the color palette at a decoder side; and applying palette mode encoding or decoding to the current block using the color palette.

10. The method of claim 9, wherein the first-color component corresponds to a luma component; said one or more second-color components correspond to a first chroma component and a second chroma component; and the current block includes a luma block consisting of luma samples, a first chroma block consisting of first chroma samples and a second chroma block consisting of second chroma samples.

11. The method of claim 10, wherein if the non-444 color format corresponds to a 4:2:0 color format, each entry of the color palette consists four luma values corresponding to quad luma samples, one first chroma value corresponding to one first chroma sample collocated with the quad luma samples, and one second chroma value corresponding to one second chroma sample collocated with the quad luma samples.

12. The method of claim 10, wherein if the non-444 color format corresponds to a 4:2:2 color format, each entry of the color palette consists two luma values corresponding to duo luma samples, one first chroma value corresponding to one first chroma sample collocated with the duo luma samples, and one second chroma value corresponding to one second chroma sample collocated with the duo luma samples.

13. The method of claim 10, wherein if the non-444 color format corresponds to a 4:2:0 color format, the color palette comprises first-type entries and second-type entries, wherein each first-type entry consists of one luma value from quad luma samples, one first chroma value of one first chroma sample collocated with the quad luma samples, and one second chroma value of one second chroma sample collocated with the quad luma samples, and wherein each second-type entry consists of three luma values for remaining three luma samples of the quad luma samples.

14. The method of claim 10, wherein the color palette comprises first-type entries and second-type entries, wherein each first-type entry consists of one luma value of one luma sample, one first chroma value of one first chroma sample, and one second chroma value of one second chroma sample from a same sample location, and wherein each second-type entry consists of one luma value for remaining luma sample positions not included in the first-type entries.

* * * * *